US012791110B2

(12) United States Patent
Suter et al.

(10) Patent No.: US 12,791,110 B2
(45) Date of Patent: Nov. 10, 2026

(54) FLOAT ARRANGEMENT AND AIR RELEASE VALVE INCORPORATING SAME

(71) Applicant: DYNAMIC FLUID CONTROL (PTY) LIMITED, Benoni (ZA)

(72) Inventors: Jonathan Michael Suter, Benoni (ZA); Trevor Clinton Veal, Benoni (ZA)

(73) Assignee: DYNAMIC FLUID CONTROL (PTY) LIMITED, Benoni (ZA)

( * ) Notice: Subject to any disclaimer, the term of this patent is extended or adjusted under 35 U.S.C. 154(b) by 0 days.

(21) Appl. No.: 18/876,417

(22) PCT Filed: Jun. 23, 2023

(86) PCT No.: PCT/IB2023/056525
§ 371 (c)(1),
(2) Date: Dec. 18, 2024

(87) PCT Pub. No.: WO2023/248202
PCT Pub. Date: Dec. 28, 2023

(65) Prior Publication Data

US 2025/0361947 A1 Nov. 27, 2025

(30) Foreign Application Priority Data

Jun. 24, 2022 (ZA) ................................ 2022/07011

(51) Int. Cl.
*F16K 24/04* (2006.01)

(52) U.S. Cl.
CPC ................................. *F16K 24/044* (2013.01)

(58) Field of Classification Search
CPC .................................................... F16K 24/044
See application file for complete search history.

(56) References Cited

U.S. PATENT DOCUMENTS 6,240,950 B1 6/2001 Harris
7,614,417 B2 11/2009 Simon et al.
8,100,153 B2 * 1/2012 Hirata .................... F16K 31/22 141/95
8,118,051 B2 2/2012 Arnalsteen et al.
8,626,232 B1 1/2014 Steinbrecher
(Continued)

OTHER PUBLICATIONS

International Search Report for PCT/IB2023/056525 dated Oct. 10, 2023, 2 pages.

(Continued)

*Primary Examiner* — P. Macade Nichols
(74) *Attorney, Agent, or Firm* — NIXON & VANDERHYE P.C.

(57) ABSTRACT

A float (60) and an air release valve (10) incorporating same. The air release valve (10), includes a main valve body (12), defining a valve chamber (14) having a first opening (16) and a second opening (18). The valve (10) further comprises a cage (24) held relative to main valve body (12), the cage (24) including a lower cage ring (28) with an opening. The float (60) takes the form of a lower float and comprises a lower portion (62) defining a first internal cavity (64) and an open end (66) and a neck portion (68) defining a second internal cavity (70). The neck portion (68) has an outer dimension which is smaller than an outer dimension of the lower portion (62). The neck portion (68) is configured, in use, to extend through the opening of the lower cage ring (28).

24 Claims, 4 Drawing Sheets

(56) References Cited

U.S. PATENT DOCUMENTS

| | | | | |
|---|---|---|---|---|
| 2005/0126633 | A1 | 6/2005 | Leonhardt | |
| 2005/0284539 | A1* | 12/2005 | Leonhardt | F16K 24/044 141/302 |
| 2008/0029160 | A1* | 2/2008 | Qiu | F16K 24/044 137/217 |
| 2012/0037834 | A1* | 2/2012 | Lang, III | F16K 24/044 137/202 |
| 2013/0092255 | A1 | 4/2013 | Lang, III et al. | |

OTHER PUBLICATIONS

Written Opinion of the ISA for PCT/IB2023/056525 dated Oct. 10, 2023, 5 pages.

* cited by examiner

FLOAT ARRANGEMENT AND AIR RELEASE VALVE INCORPORATING SAME

CROSS-REFERENCE TO RELATED APPLICATIONS

This application is the U.S. national phase of International Application No. PCT/IB2023/056525 filed Jun. 23, 2023 which designated the U.S. and claims priority to ZA Patent Application No. 2022/07011 filed Jun. 24, 2022, the entire contents of each of which are hereby incorporated by reference.

BACKGROUND TO THE INVENTION

This invention relates to a float arrangement. More particularly, the present invention relates to a float arrangement used as part of an air release valve, and to an air release valve incorporating said float arrangement.

Air release valves are well known in the art and are typically installed in liquid supply lines or pipes, to vent gases, such as air and the like which are entrained in the pipeline conveying the liquid, to the atmosphere. The air release valves are also used to prevent pressure build-up when an initially empty pipe is filled with the liquid (pressurised air discharge) and to facilitate air intake (so-called "vacuum breaks") when a filled pipe is allowed to drain, especially when a high point in the pipe is closed off. Furthermore, air release valves are known to serve the purpose of "anti-sock" or "surge protection" during rapid filling or column separation, to lessen the effect of water hammer and other dynamic pressure or flow induced phenomenon.

Typically, air release valves are flanged to an upper or high point of the pipeline and comprise a valve chamber which extends substantially vertically from the pipeline. The valve chamber has a relatively large opening or outlet to the atmosphere to allow relatively large volumes of gas to escape from the valve chamber when filling up the pipeline with liquid. A closure member is arranged within the valve chamber to selectively close the opening, typically in response to the pipeline filling with water, or in response to a flow rate or pressure differential of air between the valve chamber and the atmosphere.

In some cases, such as disclosed in WO 02/31392 A2, the closure member comprises more than one float. A first float, which is arranged proximate the outlet, is configured to close first. The first float is configured as an antishock float and includes an axial flow passage which still allows air to flow from the valve chamber through the outlet. The axial flow passage, however, is a lot smaller than the outlet, and therefore restricts volume of air allowed to flow therethrough. The restriction of airflow further causes an increase in pressure within the valve chamber. When a predetermined pressure is reached an intermediate float or closure body closes against the upper float, to close the axial flow passage of the upper float. Remaining air may then typically be vented by means of a vent pipe extending between the valve chamber and the atmosphere.

A further air release valve, such as a well-known Vent-O-Mat RGX air valve by the present applicant, includes a lower float which cooperates with the upper float, and which is also arranged within the valve chamber. When a water level in the valve chamber rises, buoyancy of the lower float causes same to float upwards and actuate the upper float. The lower float takes the form of an inverted elongate hollow cup. This particular valve suffers some known drawbacks. Firstly, due to the elongate shape of the lower float, the valve is relatively elongate, and the air release valve therefore stands proud of the pipe relatively high above the pipe to which it is connected. This causes ergonomic issues, especially in already installed infrastructure, like concrete valve chambers or enclosures. Furthermore, due to relatively small clearance between inner walls of the internal valve chamber or cavity and the lower float, debris, such as strings, solidified oils, sewage, and other impurities often get lodged between the walls of the internal valve chamber or cavity and the lower float, causing same to become stuck or obstructed, or at least hampering the performance of the float. Furthermore, due to typical concrete valve chamber height restrictions on-site, a shorter valve is desired. Longer valve floats are typically associated with better buoyancy, but often do not fit into already installed infrastructure.

A later generation of a release valves, named the Vent-O-Mat RGX II air valve with which the above drawbacks were partially addressed, followed. This valve also includes a lower float. However, the valve chamber flares out and has a widened lower portion to prevent debris getting stuck between the float and the valve chamber. The floats are furthermore supported by a cage which is supported relative to a top part of the valve chamber, and which can be removed through the top part of the valve chamber, to allow replacement and maintenance. The lower float comprises a two-part assembly of which the first part is supported by the cage, and the second part is suspended therefrom by means of a tie rod. Because of this arrangement, the valve chamber is smaller and doesn't extend as high as the valve chamber of the previous iteration. That said, due to the smaller size of the lower float, and the relatively high weight of the tie rod (being manufactured from a metal), the buoyancy of the lower float is lower than that of the float of the previous iteration, and as a result, this valve is less suitable for low pressure applications.

It is accordingly an object of the invention to provide a float and an air release valve incorporating said float, that will, at least partially, address the above disadvantages.

It is also an object of the invention to provide a float and an air valve incorporating said float, which will be a useful alternative to existing floats and air valves.

SUMMARY OF THE INVENTION

In accordance with a first aspect of the invention, there is provided a float for an air release valve, the float comprising:

- a lower portion defining a first internal cavity and an open end; and
- a neck portion defining a second internal cavity, wherein the neck portion has an outer dimension which is smaller than an outer dimension of the lower portion, and wherein the neck portion is configured, in use, to extend through a lower ring of a float cage of the air release valve.

The lower portion and neck portion may be integrally formed or fixed relative to each other, such that the first and second internal cavities are provided in communication with each other.

Further in accordance with the first aspect of the invention, the float may comprise a retaining portion which is releasably fixed to the neck portion. The retaining portion may be shaped and configured, in use, to be received by the float cage, in arrested fashion. This means that the retaining portion may operatively be retained within the float cage, thereby retaining the float relative to the float cage.

The retaining portion may have an outer dimension (in some cases, an outer diameter) which exceeds an outer dimension (or in some cases, an outer diameter) of the neck portion. The retaining portion is configured to rest on, and be supported by, the lower ring of the float cage, in use, when the lower float is in a lowered or resting position.

The retaining portion may define a threaded sleeve or ring. The retaining portion and neck portion may releasably be fixed together by means of a threaded connection or other mechanical means. In some cases, the threaded sleeve may be open ended at a top portion thereof to allow the neck portion to extend therethrough. In such cases, an upper face of the float may be defined by the neck portion.

Alternatively, the threaded sleeve may be blind such that an upper face of the float is defined by the retaining portion.

The retaining portion may take the form of an upper float portion. The upper float portion may define an internal volume between a sidewall thereof and an outer surface of the neck portion. The upper float portion may have an open bottom end through which the neck portion projects, in use.

The lower portion, neck portion and/or retaining portion may all be substantially cylindrical. A transition between the lower and neck portions may define a step.

An upper face of the float may include a nozzle seat, in the form of an insert provided in a recess formed in the upper face. The insert may be manufactured from a rubber such as EPDM, NBR, fluoroelastomers, natural rubber or synthetic rubber.

The second cavity (located in the neck portion of the float) may be a blind cavity.

A length of the neck portion may exceed a stroke of the float, such that interference between the lower portion and float cage is avoided, in use.

The float may be manufactured from a plastics material selected from the list comprising high-density polyethylene (HDPE) and ultra-high molecular weight polyethylene (UHMWPE).

In accordance with a second aspect of the invention, there is provided an air release valve, including:

- a main valve body, defining a valve chamber, having a first opening and a second opening;
- a cage, held relative to main valve body, the cage including a lower cage ring with an opening;
- a lower float, in the form of a float according to claim 1 arranged within the valve chamber, wherein
- a neck portion of the lower float extends through the opening of the lower cage ring.

Further in accordance with the second aspect of the invention, the lower float may be displaceable relative to the cage between a resting position, in which a retaining portion of the lower float rests on, and is supported by, the lower cage ring, and a buoyant position, in which the retaining portion is lifted from the lower cage ring.

The cage may comprise an upper cage ring and a plurality of cage rods extending between the upper and lower cage rings. The main body may carry an upper flange arranged proximate the second opening. The upper cage ring may be supported by the upper flange. Furthermore, the upper flange may include a ring-shaped recess within which the upper cage ring is received. The cage may extend into the valve chamber.

The air release valve may further include a top orifice flange, defining an outlet. The top orifice flange may be releasably fixed to the upper flange. The upper cage ring may be clamped between the top orifice flange and the upper flange.

Even further according to the second aspect of the invention, the air release may comprise n anti-shock float and/or a middle float (sometimes termed an upper float) arranged between the lower float and the second opening.

The anti-shock float and/or middle float may be axially displaceable relative to each other and independent from each other. The anti-shock float and/or middle float may be guided within the cage. The middle float may include a nozzle, arranged to be actuated by a nozzle seat of the lower float.

The main valve body may flare out towards a middle portion thereof.

The main valve body may carry a lower flange proximate the first opening.

BRIEF DESCRIPTION OF THE DRAWINGS

The invention will now be described in more detail, by way of example only, with reference to the accompanying drawings in which.

DESCRIPTION OF THE ILLUSTRATED EMBODIMENTS

Figure 1:
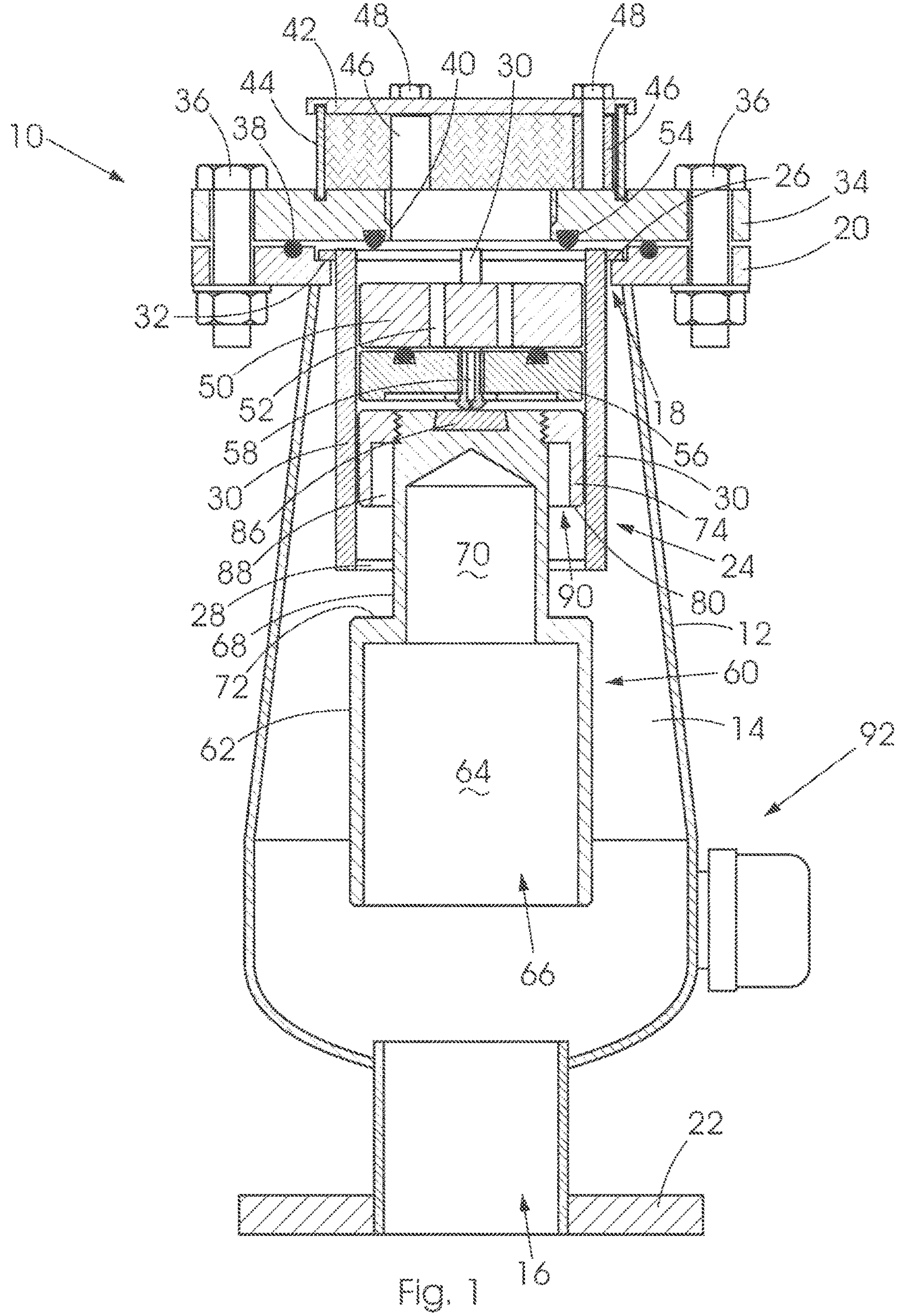
FIG. 1 shows a sectioned side view of an air release valve in accordance with the invention.
Figure 2:
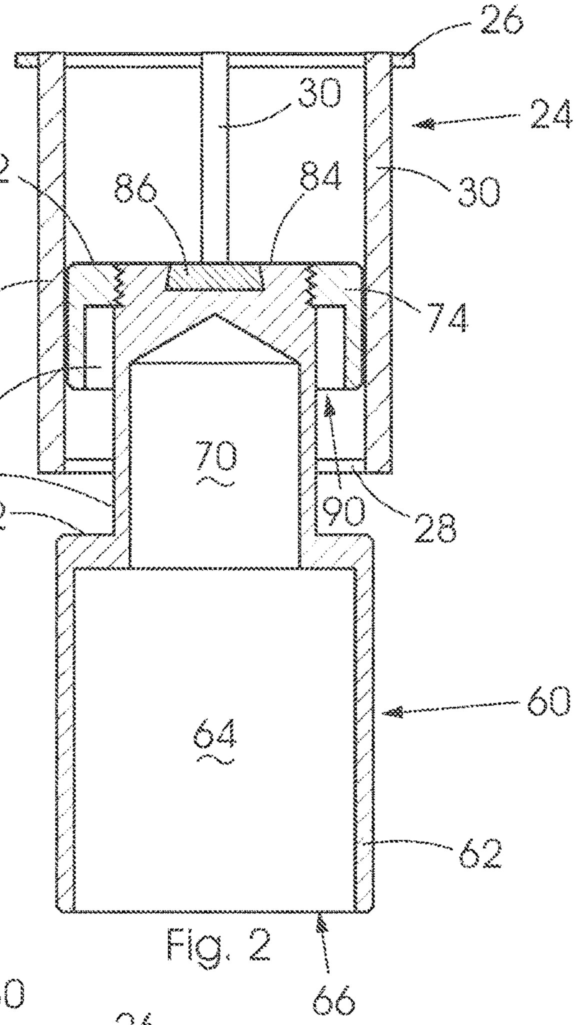
FIG. 2 shows a sectioned side view of a lower float and cage assembly, forming part of the valve of FIG. 1.
Figure 3:
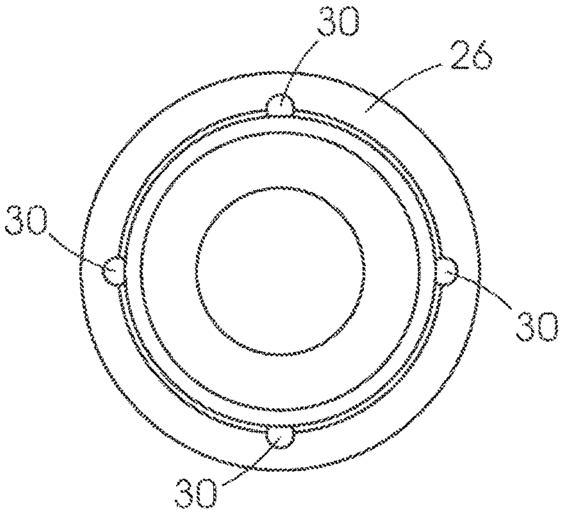
FIG. 3 shows a bottom view of the assembly of FIG. 2.
Figure 4:
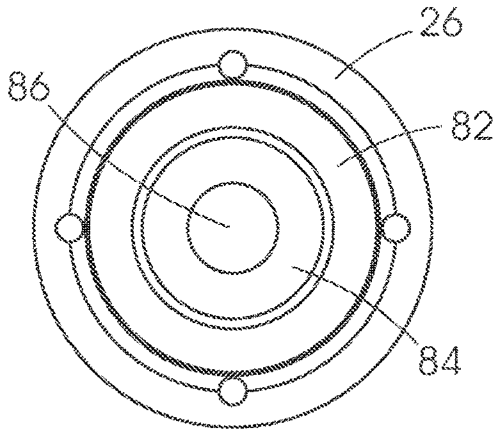
FIG. 4 shows a top view of the assembly of FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted”, “connected”, “engaged” and variations thereof are used broadly and encompass both direct and indirect mountings, connections, supports, and couplings and are thus intended to include direct connections between two members without any other members interposed therebetween and indirect connections between members in which one or more other members are interposed therebetween. Further, “connected” and “engaged” are not restricted to physical or mechanical connections or couplings. Additionally, the words “lower”, “upper”, “upward”, “down” and “downward” designate directions in the drawings to which reference is made. The terminology includes the words specifically mentioned above, derivatives thereof, and words or similar import. It is noted that, as used in this specification and the appended claims, the singular forms “a,” “an,” and “the,” and any singular use of any word, include plural referents unless expressly and unequivocally limited to one referent. As used herein, the term “include” and its grammatical variants are intended to be non-limiting, such that recitation of items in a list is not to the exclusion of other like items that can be substituted or added to the listed items.

Referring to the drawings, in which like numerals indicate like features, a non-limiting example of an air release valve (or simply “valve” for brevity) in accordance with the invention is generally indicated by reference numeral 10.

The valve 10 comprises main valve body 12 which defines an internal valve chamber or cavity 14, a first opening 16 and a second opening 18. The main valve body 12 carries an upper flange 20 relative to the second opening 18, and a lower flange 22 relative to the first opening 16. In use, the lower flange may be fixed to a high point of a pipeline (not shown).

Figure 5:
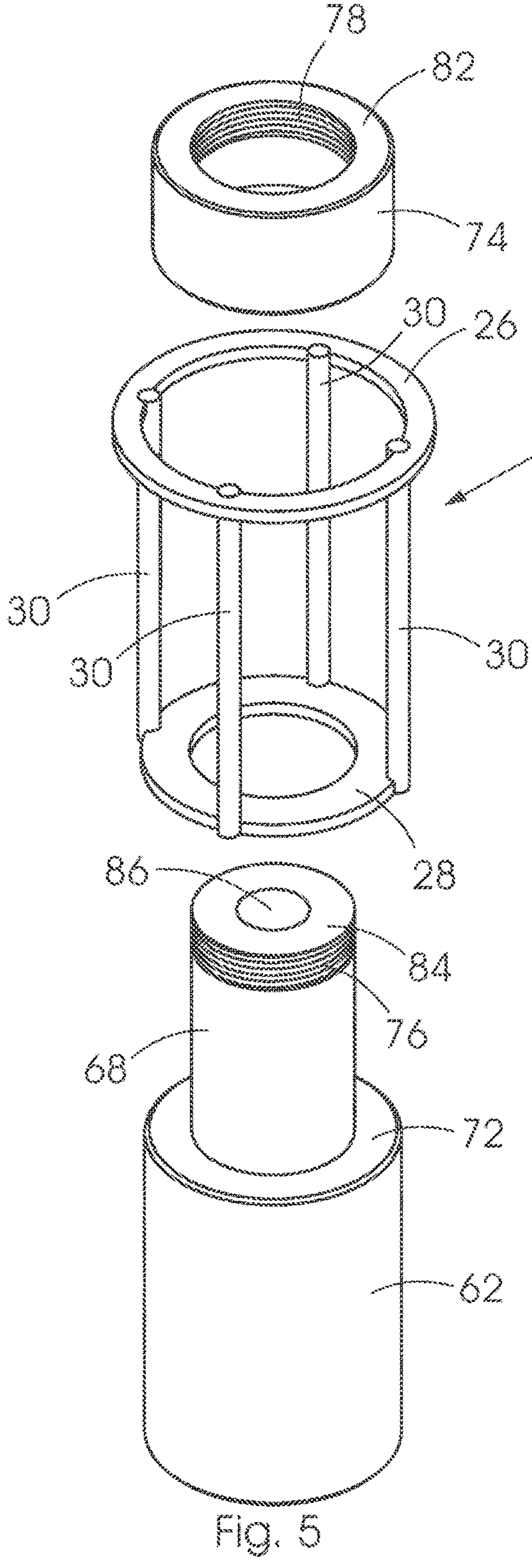
FIG. 5 shows an exploded top perspective view of the assembly of FIG. 2.
Figure 6:
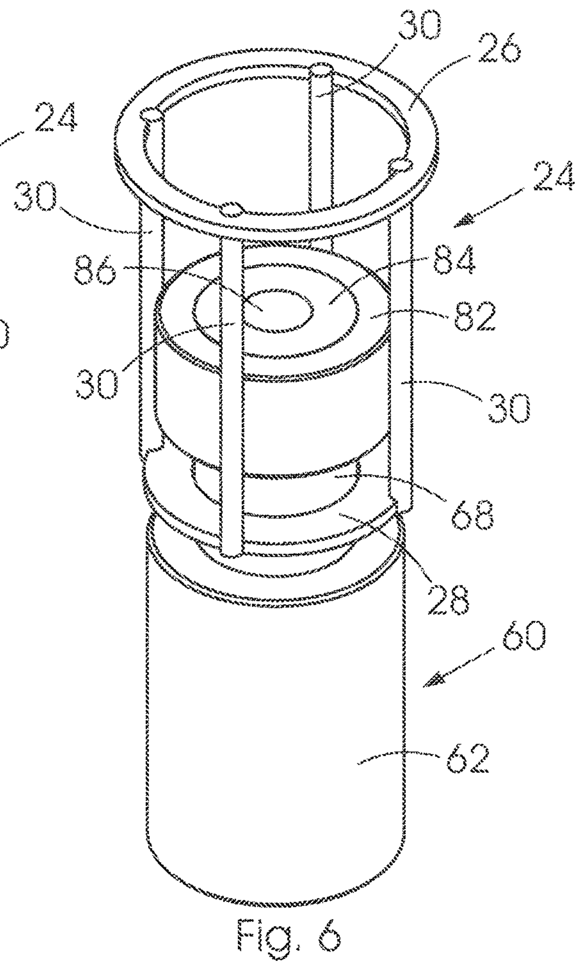
FIG. 6 shows a top perspective view of the assembly of FIG. 2.
Figure 7:
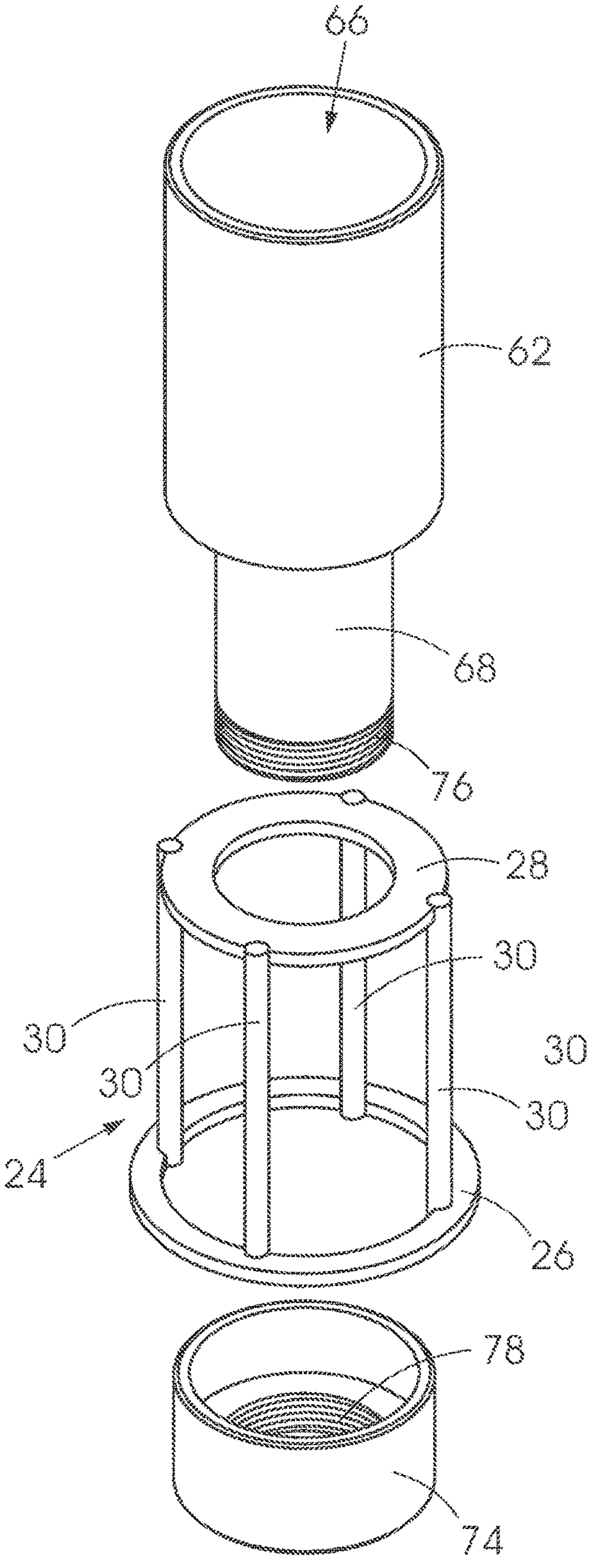
FIG. 7 shows an exploded bottom perspective vie of the assembly of FIG. 2.
Figure 8:
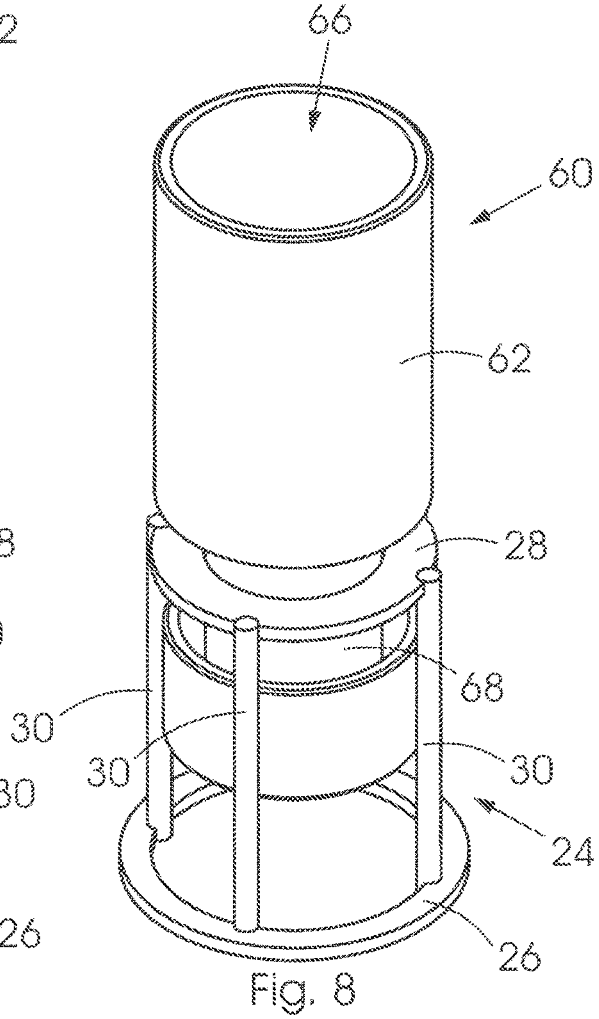
FIG. 8 shows a bottom perspective view of the assembly of FIG. 2.

The valve 10 includes a cage 24 (which is best shown in FIG. 5), which comprises an upper cage ring 26, lower cage ring 28 and a number of cage rods 30 extending between the upper and lower cage rings (26, 28). Typically, three or more cage rods 30 are provided, and equidistantly spaced about the upper and lower cage rings (26, 28).

The cage 24, or at least a substantial portion thereof, extends axially within the internal valve chamber 14. The cage 24 is held relative to the main valve body 12. As shown in FIG. 1, the upper flange 20 may include a ring-shaped recess 32 within which the upper cage ring 26 may be received and with which the cage 24 may be supported in position.

A cap, lid, or top orifice flange 34 is fixed to the upper flange 20 by means of a bolted connection 36. An O-ring 38 is received between the upper flange 20 and the top orifice flange 34, to create an airtight seal. The top orifice flange 34 includes a relatively large opening 40. A top cover 42 is provided over the opening 40 and is spaced therefrom by means of spacers 46 and held in place by bolts 48. A strainer 44 is provided to prevent foreign matter and debris from entering through the opening 40.

The cage 24 is provided for supporting a number of floats.

Firstly, an antishock float 50 of the known kind is provided, the antishock float 50 including one or more passages 52 for air. The use and operation of the antishock float 50 will not be further described herein. It will, however, be noted that the antishock float 50 is guided between the rods 30 and is allowed to be displaced axially within the cage. An O-ring 54 is provided in a bottom surface of the top orifice flange 34, against which the antishock float 50 seals when same is displaced upwards during use.

Secondly, an upper float 56 is provided below the antishock float 50. The upper float 56 includes a nozzle 58. The upper float 56 and nozzle 58 are of the known kind and will not be described in detail herein. Again, the upper float 56 is supported and held by the cage, and can be displaced axially, independently from the antishock float 50.

Thirdly, the valve 10 comprises a lower float 60.

The lower float 60 comprises a lower portion 62, defining a first internal cavity 64 and an open end 66. In use, the open end 66 faces downward.

The lower float 60 also comprises a neck portion 68 which defines a second internal cavity 70. Typically, the neck portion 68 is substantially cylindrical, and dimensioned such that an outer diameter thereof is smaller than an outer diameter of the lower portion 62. The outer diameter of the neck portion 68 is specifically selected to enable the neck portion 68 to extend through an opening in the lower cage ring 28 without interference. Therefore, the lower portion 62 extends outside of the cage 24. The outer diameter of the lower portion 62 exceeds the opening in the lower cage ring 28.

In the example shown in the figures the lower portion 62 and neck portion 68 are integrally formed. Alternatively, the lower portion 62 and neck portion 68 may comprise separate parts which may be fixed or releasably fixed relative to each other. The first and second internal cavities (64, 70) are provided in communication with each other, irrespective of the construction of the lower and neck portions (62, 68).

A transition between the lower portion 62 and the neck portion 68 forms a step 72.

The second internal cavity 70 may be blind cavity. As a result, when a level of water within the internal valve chamber 14 rises above the open end 66, air within the first and second internal cavities (64, 70) will be trapped. The air trapped within the first and second internal cavities (64, 70) provides buoyancy to the lower float 60.

The lower float 60 includes an upper float portion 74, which is releasably fixed to the neck portion 68. The upper float portion 74 and neck portion 68 are fixed by means of a threaded connection, comprising an outer thread 76 formed on the neck portion 68 and an inner thread 78 formed on the upper float portion 74.

The upper float portion 74 is arranged within the cage 24, similar to the upper float 56 and antishock float 50. Similarly, also, the upper float portion 74 is displaceable relative to the cage 24. A lower surface 80 of the upper float portion 74 rests on the lower cage ring 28, when the lower float 60 is configured in a “lowered” or “resting” configuration. The lower float 60 will also typically be configured in or towards the lowered configuration under vacuum or draining conditions within the pipeline. The upper float portion 74 therefore has an outer diameter exceeding the outer diameter of the neck portion 68.

It will be appreciated that the upper float portion 74 and the neck portion 68 are releasably fixed to each other, to facilitate assembly. In use, the upper float portion 74 is typically inserted into the cage 24 from the top (through the opening in the upper cage ring 26), whereafter, the neck portion is inserted through the opening in the lower cage ring 28 and screwed into upper float portion 74.

The upper float portion 74 has an upper surface 82. In the embodiment shown in the figures, the upper float portion 74 defines an open-ended threaded sleeve, within which the neck portion 68 is received. Therefore, an upper surface 84 of the neck portion protrudes through the open end of the upper float portion 74 and defines an upper surface of the lower float 60.

In another embodiment, which is not shown, the upper float portion 74 may include a blind threaded hole, and therefore, the upper surface 82 of the upper float portion 74 may define the upper surface of the lower float 60.

The upper surface (whether defined by the upper surface 82 or 84) of the lower float 60 includes a nozzle seat 86, manufactured from a rubber material, such as EPDM, Viton®, NBR or other natural or synthetic rubbers, and provided for actuating the nozzle of the upper float 56, in use. The nozzle seat 86 therefore takes the form of a rubber insert, received in a recess of the upper surface of the lower float 60. Alternatively, the nozzle seat 86 may be manufactured from a rubberised metallic or polymeric material.

The upper float portion 74 defines an internal volume or cavity 88 between an outer wall of the upper float portion 74 and the neck portion 68. The internal cavity also has an operatively downward facing opening 90. The internal cavity is formed to increase buoyancy of the upper float portion 74 in cases where a water level within the internal valve chamber 14 reaches the upper valve portion 74, and/or increase the buoyancy of the lower float 60 as a whole, by the removal of material resulting in a lower overall weight.

It will be appreciated that the upper float portion 74 performs a retaining function and acts as a retaining portion, in that it retains the lower float 60 relative to the float cage 24 (since the upper float portion 74 is arranged in arrested fashion relative to the float cage 24, and operatively fixed to the neck portion 68). In some embodiments, which are not shown in the figures, the upper float portion 74 may be replaced by an alternative retaining portion, such as a retaining ring or the like, which provides a similar retaining function.

Typically, the lower float 60 is manufactured from a plastics material, such as HDPE or UHMWPE.

As shown in FIG. 1, the main body flares outwardly towards a bottom portion 92 thereof. This ensures ample space between inner walls of the main body 12 and the lower float, thereby limiting obstructions caused by debris becoming lodged between the main body and the lower float.

In use, the lower flange 22 is fixed to a high point of the pipeline. In some cases, water enters the internal valve chamber 14 through the opening 16. When a level of the water within the internal valve chamber 14 reaches and exceeds a level of the open end 66, the lower float 60 is buoyed upwards, and is lifted from the lowered or resting position to a buoyant or lifted position.

The buoyancy of the lower float 60 is significantly higher than that of conventional lower floats. This higher buoyancy is achieved by the step 72, which, firstly, allows a second internal cavity 70 to extend into the cage 24, and secondly, allows the diameter of the lower portion to be significantly larger than the neck portion 68. As a result, a volume of trapped air within the first and second internal cavities (64, 70) is larger than that of conventional floats. This configuration still allows the valve 10 to be relatively compact and allows the cage and float assembly to be removed from the top of the valve 10, through the opening 18, to facilitate maintenance or replacement.

The above factors (resulting in the increased buoyancy of the lower float 60) make the valve 10 particularly suitable for use in low pressure applications, where conventional valves typically do not function properly.

It will be appreciated that a length of the neck portion 68 is longer than a stroke of the lower float 60, to ensure that the lower float 60 can be displaced fully from the resting or lowered position to the buoyant position, without the step 72 interfering with the cage 24.

It will be appreciated that the above description only provides example embodiments of the invention and that there may be many variations without departing from the spirit and/or the scope of the invention. It will easily be understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A float assembly for an air release valve comprising:
   - a float cage including a lower cage ring defining an opening; and
   - a float displaceable relative to the float cage, the float comprising:
     - a lower portion defining a first internal cavity and an open end; and
     - a neck portion defining a second internal cavity, the neck portion extending through the opening of the lower cage ring and having an outer dimension smaller than an outer dimension of the lower portion; and
     - a retaining portion releasably fixed to the neck portion, wherein the retaining portion has an outer dimension exceeding the outer dimension of the neck portion, and wherein the retaining portion rests on and is supported by the lower cage ring when the float is in a lowered or resting position.

2. The float assembly according to claim 1, wherein the lower portion and the neck portion of the float are integrally formed or fixed relative to each other, such that the first and second internal cavities are provided in communication with each other.

3. The float assembly according to claim 1, wherein the retaining portion is received by the float cage, in arrested fashion, such that the retaining portion is operatively retained within the float cage, thereby retaining the float relative to the float cage.

4. The float assembly according to claim 1, wherein the retaining portion defines a threaded sleeve and wherein the retaining portion and neck portion are releasably fixed together by means of a threaded connection.

5. The float assembly according to claim 4, wherein the threaded sleeve is open ended at a top portion thereof to allow the neck portion to extend therethrough and such that an upper face of the float is defined by the neck portion.

6. The float assembly according to claim 4, wherein the threaded sleeve is blind such that an upper face of the float is defined by the retaining portion.

7. The float assembly according to claim 1, wherein the retaining portion takes the form of an upper float portion which defines an internal volume between a sidewall thereof and an outer surface of the neck portion, and wherein the upper float portion has an open bottom end, through which the neck portion projects, in use.

8. The float assembly according to claim 1 wherein the lower portion and neck portion are both substantially cylindrical and wherein a transition between the lower and neck portions defines a step.

9. The float assembly according to claim 1, wherein an upper face of the float includes a nozzle seat, in the form of an insert provided in a recess formed in the upper face.

10. The float assembly according to claim 9, wherein the insert is manufactured from a rubber selected from a list comprising EPDM; NBR; fluoroelastomers; natural rubber; and synthetic rubber.

11. The float assembly according to claim 1, wherein the second internal cavity is a blind cavity.

12. The float assembly according to claim 1, wherein a length of the neck portion exceeds a stroke of the float.

13. The float assembly according to claim 1, manufactured from a plastics material selected from the list comprising high-density polyethylene (HDPE) and ultra-high molecular weight polyethylene (UHMWPE).

14. An air release valve, including:

a main valve body, defining a valve chamber, having a first opening and a second opening; and a float assembly according to claim 1, wherein the float cage is held relative to main valve body, the float is arranged within the valve chamber.

15. The air release valve according to claim 14, wherein the float is displaceable relative to the cage between the resting position, in which the retaining portion rests on, and is supported by, the lower cage ring, and a buoyant position, in which the retaining portion is lifted from the lower cage ring.

16. The air release valve according to claim 14, wherein the cage comprises an upper cage ring and a plurality of cage rods extending between the upper and lower cage rings.

17. The air release valve according to claim 16, wherein the main valve body carries an upper flange arranged proximate the second opening and wherein the upper cage ring is supported by the upper flange.

18. The air release valve according to claim 17, wherein the upper flange includes a ring-shaped recess within which the upper cage ring is received and wherein the cage extends into the valve chamber.

19. The air release valve according to claim 17, further including a top orifice flange, defining an outlet, the top orifice flange being releasably fixed to the upper flange and wherein the upper cage ring is clamped between the top orifice flange and the upper flange.

20. The air release valve according to claim 14, further comprising at least one of an anti-shock float and a middle float arranged between the lower float and the second opening.

21. The air release valve according to claim 20, wherein the anti-shock float and/or middle float are axially displace-able relative to, and independent from, each other, and wherein the anti-shock float and/or middle float are guided within the cage.

22. The air release valve according to claim 20, wherein the middle float includes a nozzle, arranged to be actuated by a nozzle seat of the lower float.

23. The air release valve according to claim 14, wherein the main valve body flares out towards a middle portion thereof.

24. The air release valve according to claim 14, wherein the main valve body carries a lower flange proximate the first opening.

* * * * *